United States Patent
Hutchings et al.

(10) Patent No.: US 6,269,252 B1
(45) Date of Patent: Jul. 31, 2001

(54) PROGRAMMABLE BRIDGING APPARATUS TO CONNECT MULTIPLE NETWORKS OF DIFFERENT PROTOCOLS

(75) Inventors: William Joseph Hutchings, Scottsdale; Lee Silverthorn, Paradise Valley; Curtis L. Cornils, Chandler, all of AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/085,685

(22) Filed: May 27, 1998

(51) Int. Cl.[7] .................................................. H04B 1/36
(52) U.S. Cl. ............................................ 455/552; 370/466
(58) Field of Search ............................ 455/73, 11.1, 553, 455/552, 132, 103, 74.1, 20, 21, 22, 418; 370/911, 466, 467

(56) References Cited

U.S. PATENT DOCUMENTS

| | | | |
|---|---|---|---|
| 5,249,302 | * | 9/1993 | Metroka ............................. 455/11.1 |
| 5,490,284 | * | 2/1996 | Ito ..................................... 455/11.1 |
| 5,564,076 | * | 10/1996 | Auvray ................................. 455/76 |
| 5,894,478 | * | 4/1999 | Barzegar ............................. 370/401 |
| 5,930,708 | * | 7/1999 | Stewart ............................... 455/128 |
| 5,933,784 | * | 8/1999 | Gallagher ............................ 455/552 |
| 5,991,599 | * | 11/1999 | Uchikawa ............................. 455/20 |
| 6,047,061 | * | 4/2000 | Cornes ................................ 379/333 |
| 6,160,806 | * | 12/2000 | Cantwell ............................. 370/360 |

* cited by examiner

Primary Examiner—Daniel Hunter
Assistant Examiner—Nick Corsaro
(74) Attorney, Agent, or Firm—Maurice J. Jones

(57) ABSTRACT

A bridging apparatus (10) for use in bridging a plurality of external communications networks (20a–20n) includes a plurality of network interfaces (12) and a bridge (14). The individual interfaces within the plurality of network interfaces (12) are each capable of converting signals between a signal format used by an associated external communications network and a common signal format supported by the bridge (14). The bridge (14) establishes at least one bridge connection between network interfaces according to a predetermined bridging function. The bridge (14) includes a digital processor having an associated memory for storing one or more bridging programs. The digital processor executes at least one of the bridging programs in order to implement the desired bridging function.

26 Claims, 2 Drawing Sheets

PROGRAMMABLE BRIDGING APPARATUS TO CONNECT MULTIPLE NETWORKS OF DIFFERENT PROTOCOLS

STATEMENT OF GOVERNMENT RIGHTS

This invention was made with government support under Contract No. F30602-95-C-0026 awarded by the U.S. Air Force. The Government has certain rights in this invention.

FIELD OF THE INVENTION

The present invention relates in general to communications systems and, more particularly, to communications systems that utilize signal bridging techniques.

BACKGROUND OF THE INVENTION

A bridge is a communications device for connecting two or more communications networks together to enable communication between the networks. In a typical bridge, a message is received from one of the connected networks and is delivered to one or more other networks via a bridge connection. Bridges do not normally choose a specific path within a destination network by which to deliver a message to a destination node, but instead "broadcast" the message to all nodes within the destination network. The destination node within the destination network, knowing its own address, then accepts the message from the broadcast medium.

In wireless applications, bridges can be used to connect two or more wireless communications networks. Normally, such bridges are implemented manually by an operator having enough analog equipment to support two or more external wireless communications channels. The operator determines which external networks are to be connected and configures the analog equipment to perform the desired bridging function. As can be appreciated, such bridges are very specialized and require a costly and time consuming redesign whenever system requirements change. In addition, these bridges are relatively slow, expensive to maintain, non-adaptable, and generally non-reliable. Further, these bridges do not generally provide interoperability between incompatible networks.

Therefore, there is a need for a bridge that can be easily adapted to changing system requirements. In addition, there is a need for a bridge that is capable of supporting networks utilizing different, and possibly varying, signal formats. Further, there is a need for a bridge that does not require manual setup by an operator. Still further, there is a need for a bridge that can fill the above needs in a wireless environment.

DETAILED DESCRIPTION OF THE DRAWINGS

The present invention relates to a bridging apparatus that satisfies the above-identified needs. The bridging apparatus includes a bridge that utilizes a digital processor for implementing a desired bridging function. The digital processor includes a memory for storing at least one bridging program for execution by the digital processor. A plurality of network interfaces are coupled to the bridge for providing an interface to a plurality of external communications networks. Each network interface is capable of converting between the signal format of an associated external network and a common signal format recognized by the bridge. The digital processor, while executing a bridging program, establishes at least one bridge connection between two or more of the external communications networks. In general, a particular bridge connection (or set of bridge connections) will be maintained until there is a change in system requirements (such as the need to add a new network to or remove an old network from the bridged connection). When such a change occurs, the bridging program can be modified or a new bridging program can be supplied to support the change.

Because the bridging apparatus converts all received signals to a common signal format, the apparatus is capable of providing interoperability between a plurality of previously incompatible networks. In addition, because the bridging function is implemented in software, the bridging apparatus is easily adapted to changing system requirements, rarely requiring expensive bridge redesigns and/or manual equipment reconfiguration. Furthermore, the bridging apparatus provides a high level of software-based control to a user for providing a wide range of bridging functions between networks. The bridging apparatus of the present invention is also highly reliable, easy to use, and cost effective. While having value in virtually any bridging application, the bridging apparatus of the present invention is of particular value in wireless applications.

As used herein, the term "signal format" refers to a unique combination of signal characteristics that distinguish one signal from another. In general, systems that utilize a particular signal format cannot recognize signals having other formats. In this regard, a signal format can include, for example, a designation of one or more of the following signal characteristics: waveform type (e.g., center frequency, modulation type, etc.), information type (e.g., voice, video, data, etc.), signal protocol, multiple access type (e.g., CDMA, TDMA, FDMA, etc.), signal encryption type, signal vocoder type, and others.

Figure 1:
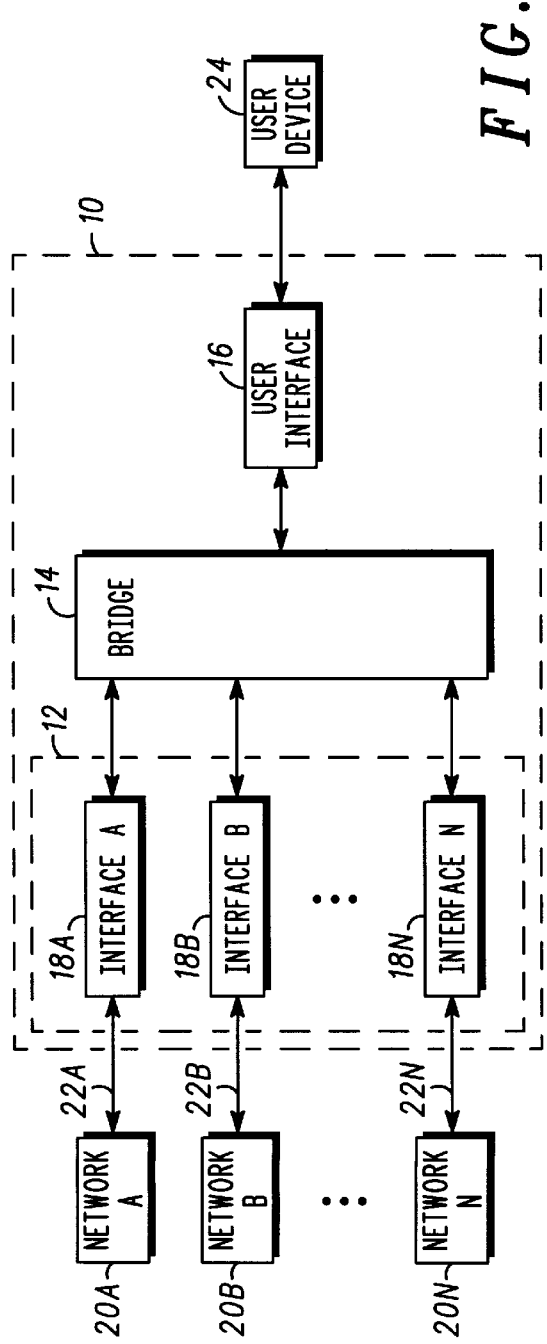
FIG. 1 is a block diagram illustrating a bridging apparatus in accordance with one embodiment of the present invention.

FIG. 1 is a block diagram illustrating a bridging apparatus 10 in accordance with one embodiment of the present invention. The bridging apparatus 10 is capable of providing bridging services between a plurality of external communications networks 20a–20n. That is, the bridging apparatus 10 is operative for establishing bridging connections between the external networks 20a–20n in accordance with system requirements. In addition, the bridging apparatus 10 is capable of interfacing with a user at user device 24 for establishing connections between the user and one or more of the external networks 20a–20n or for receiving configuration commands from the user. It should be noted that the blocks illustrated in FIG. 1 represent functional elements that do not necessarily correspond to discrete hardware units. For example, in one embodiment of the present invention, all of the illustrated functionality is implemented within a single processor.

As illustrated in FIG. 1, the bridging apparatus 10 includes: a plurality of network interfaces 12, a bridge 14, and a user interface 16. Preferably, the plurality of network interfaces 12, the bridge 14, and the user interface 16 are all located within a single support structure. The plurality of network interfaces 12 includes at least two interface functions for interfacing with external communications networks. During operation, each of the plurality of network interfaces 12 communicates with at least one of the external communications networks 20a–20n via a corresponding communications channel. For example, in the illustrated embodiment, network interface 18a communicates with external network 20a via communications channel 22a; network interface 18b communicates with external network 20b via communications channel 22b; and network interface 18n communicates with external network 20n via communications channel 22n. The communications channels 22a–22n can each include virtually any form of communications medium, either wired or wireless. Likewise, the external communications networks 20a–20n can be either wired or wireless networks. In one embodiment of the invention, all of the communications channels 22a–22n are wireless channels.

In accordance with the present invention, each of the network interfaces 18a–18n is capable of converting communications signals between a signal format used by an associated external communications network and a common signal format supported by the bridge 14. The individual network interfaces 18a–18n can be implemented in hardware, software, or a hybrid hardware/software approach can be used. In addition, the network interfaces 18a–18n can be implemented using analog processing, digital processing, or both analog and digital processing. In a preferred embodiment, the network interfaces 18a–18n are each capable of performing any of the functions necessary to convert a signal received from an external communications network to the common signal format. Likewise, the network interfaces 18a–18n are each capable of performing any of the functions necessary to convert a signal having the common signal format to an appropriate transmit signal format for delivery to an external communications network. In this regard, the network interfaces 18a–18n can each include functionality for performing one or more of the following tasks: signal reception/transmission, signal upconversion/downconversion, signal amplification, signal modulation/demodulation, error correction coding/decoding, signal encryption/decryption, vocoder encoding/decoding, protocol conversion, and others. In one embodiment of the invention, as will be described in greater detail, each of the network interfaces 18a–18n includes an individual radio channel adapted for use with a predetermined signal format.

The bridge 14 is operative for establishing at least one bridge connection between external communications networks. As used herein, the term "bridge connection" refers to a connection that allows information to flow from one of the external communications networks to any one or more of the other external communications networks via the bridge 14. For example, a bridge connection can be established that always transfers signals received by network interface 18b (from external network 20b) to both external network 20a and external network 20n. Preferably, the signal transfer is automatic to support real-time communication between networks. In one implementation, bridge connections are established by the bridge 14 whereby signals received by any one of the plurality of network interfaces 12 are automatically transferred to all of the other network interfaces in the plurality 12 for delivery to corresponding external networks. As will be apparent to a person of ordinary skill in the art, many other connection configurations are also possible.

As described above, the user interface 16 provides an interface between the bridge 14 and the user device 24. Among other things, the user interface 16 performs the required signal conversions needed for communication between the bridge 14 and the user device 24 to occur. As will be described in more detail, a user at user device 24 can deliver configuration commands to the bridge 14 over the user interface 16 instructing the bridge 14 to establish a particular bridge connection between external communications networks 20a–20n. In addition, the user can deliver new or modified bridging programs to the bridge 14 via user interface 16. In addition to these control-based functions, the user interface 16 can also be used as a communications medium for transferring communication signals between user device 24 and one or more of the external networks 20a–20n. In one embodiment of the invention, for example, all communications signals received from any of the external communications networks 20a–20n are automatically delivered to the user device 24 for consideration by the user. Similarly, all communications signals generated by the user can be delivered to all of the external communications networks 20a–20n. Other user connections are also possible.

In accordance with the present invention, the functionality of the bridge 14 is implemented in software within a digital processor. The digital processor can include, for example, a general purpose microprocessor (GPP), a digital signal processor (DSP), a reduced instruction set computer (RISC), a complex instruction set computer (CISC), or any other type of digital processing device. In general, the digital processor will include a memory (such as a random access memory (RAM)) that is capable of storing one or more bridging routines. To establish one or more bridge connections, the digital processor executes a corresponding bridging routine stored in the memory.

It should be appreciated that the bridging apparatus of the present invention does necessarily convert all received signals to the common signal format for purposes of bridging the signals. For example, if two or more external networks that utilize the same signal format are being bridged, the signals can be directly bridged without conversion. In addition, if two or more external networks are being bridged that utilize some, but not all, of the same signal formatting (such as, for example, using different modulation types but the same voice coding type), received signals can be converted down to an intermediate signal format that is common to the two or more external networks before bridging. Intelligence can be provided within the bridge 14 for determining when one of the above arrangements can be performed.

Figure 2:
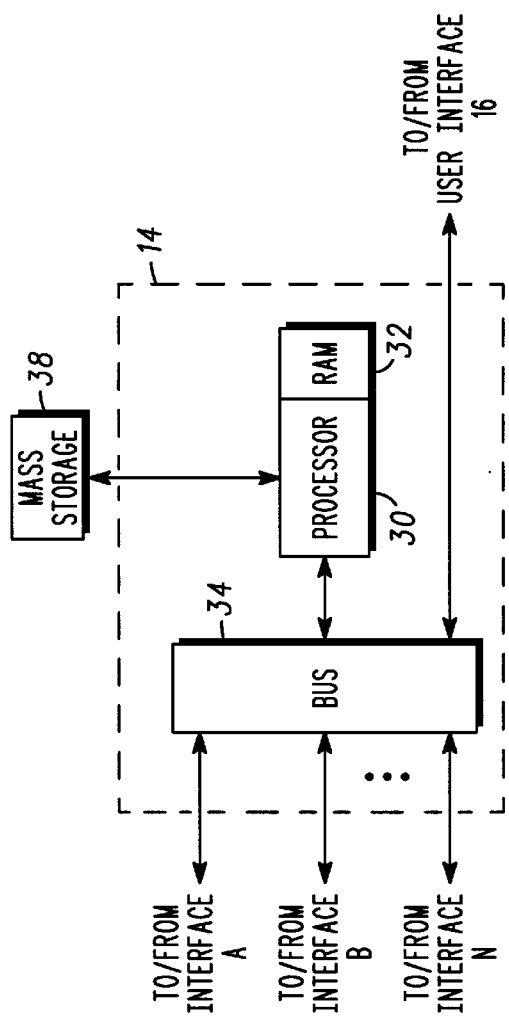
FIG. 2 is a block diagram illustrating a software bridge in accordance with one embodiment of the present invention.

FIG. 2 is a block diagram illustrating a bridge 14 in accordance with one embodiment of the present invention. As illustrated, the bridge 14 includes a processor 30 with associated RAM 32 and a hardware bus 34. The processor 30 is coupled to a mass storage unit 38 located outside the bridge 14. The processor 30, the user interface 16, and the plurality of network interfaces 12 are coupled to the hardware bus 34 for use in transferring information between the units. In a preferred embodiment, the various elements are connected to the hardware bus 34 via standard hardware interfaces, such as standard input/output (I/O) ports. In addition, further I/O ports can be provided for supporting, among other things, additional external communications networks in the future.

Using the hardware bus 34, bridging commands and/or routines can be transferred from a user to the processor 30. For example, in one scenario the user can instruct the processor 30 to execute a different bridging routine in the RAM 32 than it is currently executing. In another possible scenario, the user can instruct the processor 30 to download a bridging routine from the mass storage unit 38 to the RAM 32 for execution. In yet another possible scenario, the user can deliver a new bridging routine to the processor 30 for storage in the RAM 32 and/or the mass storage unit 38 via hardware bus 34. Hardware bus 34, under the control of the processor 30, is also used to implement the bridge connections between external communications networks. The processor 30 knows the port addresses of each of the plurality of network interfaces 12. Therefore, by appropriately controlling the hardware bus 34, the processor 30 can establish any desired connection between network interfaces. As can be appreciated, the number of different connection configurations that can be implemented within the bridge 14 is only limited by the number of external networks that are coupled to the bridging apparatus 10. In addition, because the bridging connections are established through software, the connections can be quickly and easily changed based on current system requirements. In this regard, the bridging apparatus of the present invention provides a level of bridging control that has not heretofore been realized.

In one embodiment of the present invention, at least some of the interface functionality is implemented in software within the same processor as the bridging functionality. That is, the processor stores some programs that are capable of performing bridging functions and some that are capable of performing interface functions. The processor then executes the different programs as needed. Other interface functions can be implemented outside of the processor using, for example, discrete digital or analog hardware elements. In one approach, discrete analog hardware elements (such as, for example, mixers, low noise amplifiers, and analog filters) are used to process a signal received from an external communications network. The resulting signal is then converted to digital form (in an analog-to-digital (A/D) converter, for example) before being delivered to the processor. The processor can then perform further interface functions on the signal, such as demodulation, decryption, error correction, and/or protocol conversion. The processor will know how to process a given signal based on the port through which the signal was received. In another approach, separate digital processors are used to perform the interface functions and the bridging functions. As can be appreciated, a number of other processing alternatives are also possible in accordance with the present invention.

In one aspect of the present invention, the plurality of network interfaces 12 includes at least one interface that is electronically reconfigurable. That is, the network interface can be reprogrammed in the field for changing, for example, the signal format supported by the interface. This feature is advantageous in situations where, for example, the signal format used by one of the external communications networks has been revised. In addition, this feature allows an old network to be quickly and easily replaced by a new network using a different signal format. If the network interfaces are wholly or partially software-based, reconfiguration can be as simple as changing the program being used to implement the interface. In another approach, field programmable gate arrays (FPGAs) are used to provide the desired reconfigurability. To be reconfigured, an FPGA generally requires a new configuration file to be delivered to an input of the unit. If a signal format change occurs in a particular external network, for example, a new configuration file can be delivered to a corresponding FPGA to maintain bridge compatibility with the external network. Other types of reconfigurable equipment may also be appropriate. A library of configuration files and/or interface programs can be maintained within the bridging apparatus 10 for use in configuring the plurality of network interfaces 12.

Figure 3:
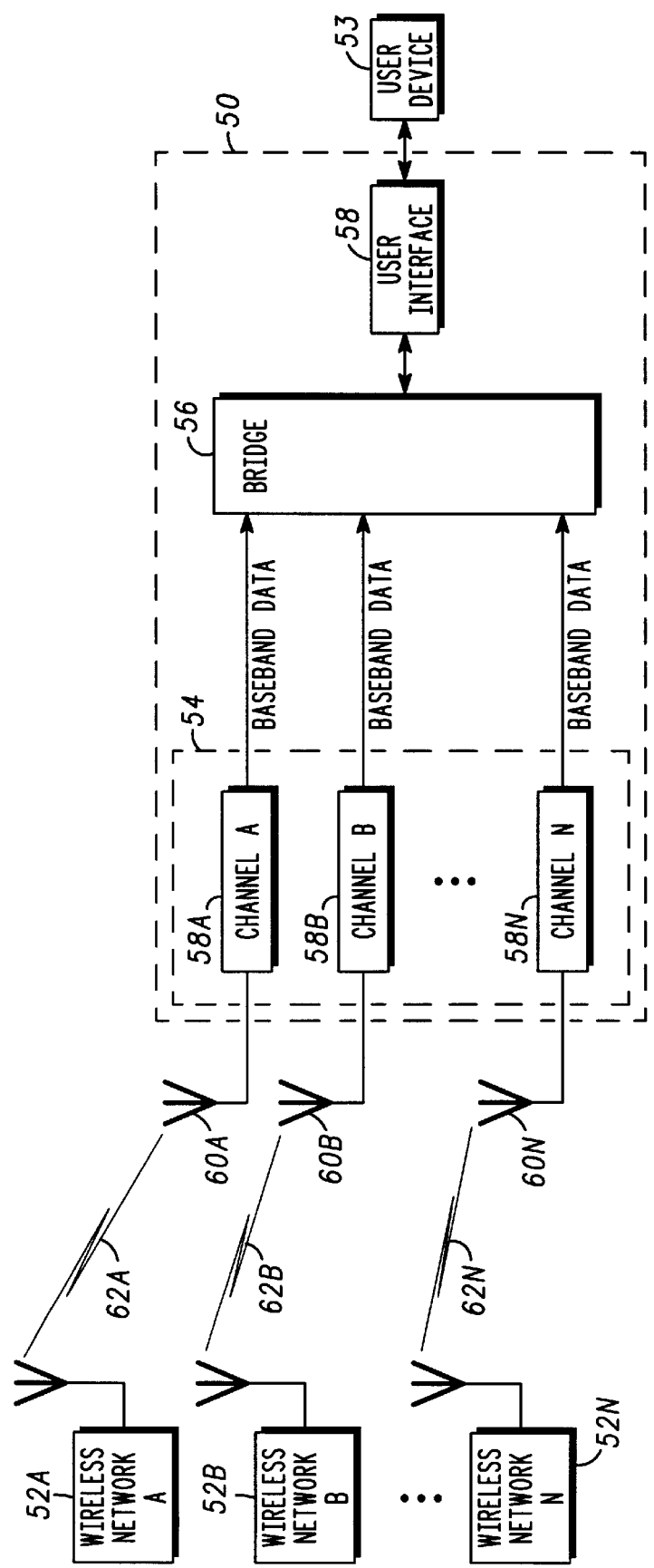
FIG. 3 is a block diagram illustrating a bridging apparatus in accordance with another embodiment of the present invention.

FIG. 3 is a block diagram illustrating a multi-channel radio system 50 in accordance with one embodiment of the present invention. The multi-channel radio system 50 is capable of supporting radio communications between a user of the radio system 50 (located at user device 53) and any one or more of a plurality of external wireless networks 52a–52n. In addition, the multi-channel radio system 50 is capable of setting up bridging connections between external wireless networks 52a–52n in accordance with system requirements.

As illustrated in FIG. 3, the radio system 50 includes: a plurality of radio channels 54, a bridge 56, and a user interface 58. Each of the plurality of radio channels 54 is connected to an antenna for communication with one or more of the external wireless networks 52a–52n via a corresponding wireless communications channel. For example, in the illustrated embodiment, radio channel 58a is coupled to antenna 60a for communication with wireless network 52a via wireless channel 62a; radio channel 58b is coupled to antenna 60b for communication with wireless network 52b via wireless channel 62b; and radio channel 58n is coupled to antenna 60n for communication with wireless network 52n via wireless channel 62n. It should be appreciated that other antenna arrangements, such as antenna sharing arrangements, can also be used in accordance with the present invention. In one embodiment, for example, a single array antenna having multiple fixed or independently steerable beams is utilized.

Each of the radio channels 58a–58n comprises a radio transceiver capable of receiving/transmitting communications signals (from/to a corresponding wireless channel) having a signal format defined by a corresponding external wireless network 52a–52n. The radio channels 58a–58n are each capable of converting a received signal into a baseband data representation for delivery to the bridge 56. Likewise, the radio channels 58a–58n are each capable of converting a baseband data signal received from the bridge 56 into an appropriate transmit signal format for delivery to a corresponding external communications network 52a–52n. Each of the radio channels 58a–58n can be configured for use with a different wireless signal format or two or more (or all) can be adapted for use with the same wireless signal format. The radio channels 58a–58n can include, for example, off-the-shelf radio slices that can be plugged directly into an expansion slot on a hardware bus. Alternatively, one or more of the radio channels 58a–58n can be implemented using an FPGA, or other reconfigurable resource. Likewise, some or all of each radio channel can be implemented in software. In addition, standard hardware implementations can be utilized.

The bridge 56 performs substantially the same functions as the bridge 14 of FIG. 1. That is, the bridge 56 establishes at least one bridge connection between external wireless networks 52a–52n. In addition, the bridge 56 can establish communications connections between the user device 53 and any one or more of the external wireless networks 52a–52n. As before, the functionality of the bridge 56 is implemented in software within a digital processor. Also as before, the bridge 56 can receive configuration commands and/or bridging programs from a user via user interface 58.

In a preferred embodiment, the plurality of radio channels 54, the bridge 56, and the user interface 58 are all included within a single box. That is, the elements are all supported by a single support structure, such as a radio housing. By including the bridging functionality within the same box as the radio equipment, the efficiency of data delivery between external networks can be significantly increased. In addition, the "single box" approach allows complex control by a user of the radio system 50. The radio system 50 of the present invention can be implemented in, for example, (i) a rack mountable housing for use in basestation and/or other stationary applications or (ii) a relatively compact, portable housing for use in mobile applications. In one embodiment, a handheld, multi-channel bridging radio is provided. Other implementations, such as those involving marine and/or airborne applications, also exist.

What is claimed is:

1. A bridging apparatus for use in a wireless communications system suitable for being programmed by software programs to communicate wireless signals of different formats between a plurality of external wireless communication networks and a user, comprising:

a plurality of network interfaces for use in communicating with the plurality of external wireless communications networks, each of said plurality of network interfaces being capable of converting a wireless communications signal between a signal format used by an associated external wireless communications network and a common signal format used by said bridging apparatus;

a bridge, operatively coupled to said plurality of network interfaces, for establishing at least one bridge connection between the external wireless communications networks, said bridge operating on communications signals having said common signal format, wherein said bridge includes a processor and a memory, said processor for executing programs stored in said memory, wherein said memory includes a program for effecting said at least one bridge connection;

a user interface, coupled to said bridge, for use in transferring information to said bridge from the user of said bridging apparatus and for transferring information to the user from said bridge;

said user interface being adapted for use in delivering the software programs from said user to said bridge;

at least one of said plurality of network interfaces being electronically reconfigurable for operating with the different signal formats;

said at least one bridge connection being reconfigured by changing a software program executed by said processors;

at least two of the plurality of external communications networks using signal formats that are different from one another; and at least one of the plurality of network interfaces communicating a wireless signal with a corresponding external communications network via a wireless communications channel.

2. The apparatus, as claimed in claim 1, wherein:
said plurality of network interfaces and said bridge are mounted on a common support structure.

3. The apparatus, as claimed in claim 1, wherein:
at least one of said plurality of network interfaces includes a transceiver adapted for use with a predetermined wireless signal format.

4. The apparatus, as claimed in claim 1, wherein:
said common signal format comprises a baseband data signal format.

5. The apparatus, as claimed in claim 1, wherein:
said user interface is adapted for use in transferring communications signals between said user and said plurality of network interfaces.

6. The apparatus, as claimed in claim 1, wherein:
said user interface is adapted for use in delivering configuration commands from said user to said bridge.

7. The apparatus, as claimed in claim 1, wherein:
at least one of said plurality of network interfaces includes a field programmable gate array (FPGA).

8. The apparatus, as claimed in claim 1, wherein:
said at least one bridge connection includes a first connection between a first network interface and at least one second network interface, wherein all communications signals received by said first network interface from a corresponding external communications network are automatically transferred to said at least one second network interface.

9. The apparatus, as claimed in claim 1, wherein:
each of said plurality of network interfaces is capable of converting a voice signal between a first voice signal format and a second voice signal format.

10. The apparatus, as claimed in claim 9, wherein:
said first voice signal format utilizes a first vocoder type.

11. The apparatus, as claimed in claim 9, wherein:
said voice signal is converted using a digital translation.

12. The apparatus, as claimed in claim 1, wherein:
said apparatus is implemented within a wireless basestation.

13. A bridging apparatus for use in a wireless communications system suitable for being programmed by software programs to communicate wireless signals of different formats between a plurality of external wireless communication networks and a user, comprising:

a plurality of network interfaces for use in communicating with the plurality of external communications networks, each of said network interfaces being capable of converting a wireless communications signal between a signal format used by an associated external wireless communications network and a common signal format used by said bridging apparatus;

a bridge, operatively coupled to said plurality of network interfaces, for establishing at least one bridge connection between the external wireless communications networks, said bridge operating on communications signals having said common signal format, said bridge including a processor and a memory, said processor for executing programs stored in said memory wherein said memory includes a program for effecting said at least one bridge connection;

a user interface, operatively coupled to said bridge, for allowing information transfer to said bridge from the user of said bridging apparatus and for transferring information to the user from said bridge;

wherein said plurality of network interfaces, said bridge, and said user interface are all mounted on a common support structure;

said bridge includes a processor and a memory, said processor being capable of executing programs stored in said memory, wherein said memory includes at least one program for effecting said at least one bridge connection; and at least one of said plurality of network interfaces being electronically reconfigurable for operating with the different signal formats.

14. The apparatus, as claimed in claim 13, wherein:
at least one of said plurality of network interfaces includes a transceiver adapted for use with a predetermined wireless signal format.

15. The apparatus, as claimed in claim 13, wherein:

said common support structure is adapted for use in stationary applications.

16. The apparatus, as claimed in claim 15, wherein:

said common support structure includes a rack mountable housing.

17. The apparatus, as claimed in claim 13, wherein:

said common support structure includes a portable housing for use in mobile applications.

18. The apparatus, as claimed in claim 17, wherein:

said portable housing includes a handheld communicator housing.

19. A multi-channel radio for communicating with a plurality of external wireless communications networks suitable for being programmed by software programs to communicate wireless signals of different formats between a plurality of external wireless communication networks and a user, said radio comprising:

a plurality of radio transceivers for use in communicating with the plurality of external wireless communications networks, each of said plurality of radio transceivers being capable of converting a wireless communications signal between a predetermined wireless signal format and a common signal format used by said multi-channel radio;

a bridge, operatively coupled to said plurality of radio transceivers, for establishing at least one bridge connection between the external wireless communications networks, said bridge operating on communications signals having said common signal format, said bridge including a processor and a memory, said processor for executing programs stored in said memory wherein said memory includes a program for effecting said at least one bridge connection;

a user interface, operatively coupled to said bridge, for allowing information transfer to said bridge from the user of said multi-channel radio and for transferring information to the user from said bridge;

wherein said plurality of radio transceivers, said bridge, and said user interface are all mounted on a common support structure;

said bridge includes a processor and a memory, said processor being capable of executing programs stored in said memory, wherein said memory includes at least one program for effecting said at least one bridge connection; and at least one of said plurality of radio transceivers being electronically reconfigurable.

20. The radio, as claimed in claim 19, wherein:

said common signal format comprises a baseband data signal format.

21. The radio, as claimed in claim 19, wherein:

said common support structure is adapted for use in stationary applications.

22. The radio, as claimed in claim 21, wherein:

said common support structure includes a rack mountable housing.

23. The radio, as claimed in claim 21, wherein:

said common support structure is adapted for use in a basestation.

24. The radio, as claimed in claim 19, wherein:

said common support structure includes a portable housing for use in mobile applications.

25. The radio, as claimed in claim 24, wherein:

said portable housing includes a handheld communicator housing.

26. The radio, as claimed in claim 19, wherein:

at least one of said plurality of radio transceivers includes a field programmable gate array (FPGA).

\* \* \* \* \*